Feb. 5, 1929.
J. BECKER
1,700,971
STANDPIPE APPARATUS
Filed July 6, 1926
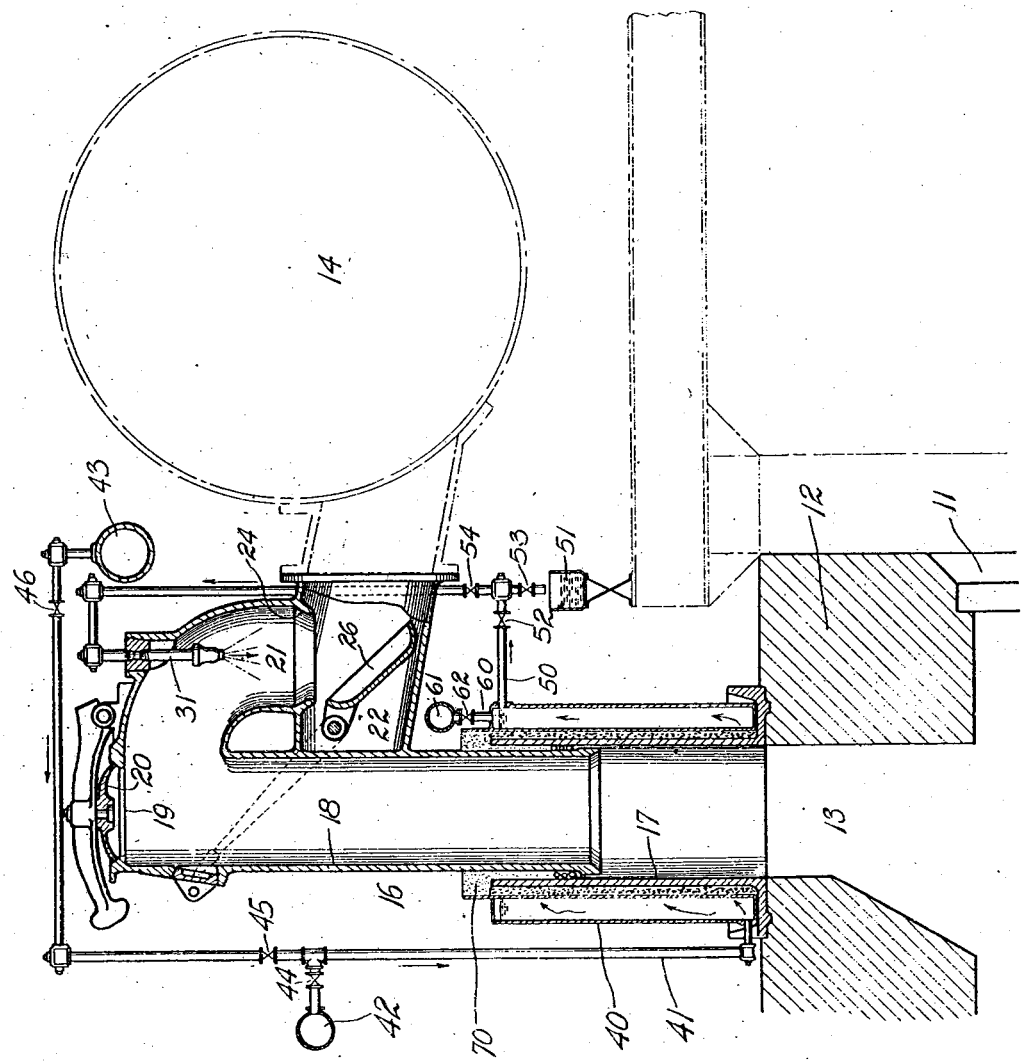
INVENTOR.
Joseph Becker
BY Munday, Clarke & Carpenter
ATTORNEYS.

Patented Feb. 5, 1929.

1,700,971

UNITED STATES PATENT OFFICE.

JOSEPH BECKER, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

STANDPIPE APPARATUS.

Application filed July 6, 1926. Serial No. 120,825.

My invention relates to means for cooling ascension or standpipe apparatus of the general character exemplified in the patent to van Ackeren 1,581,556, granted April 20, 1926, and is of particular importance in removing the hot gases of distillation from the tops of coking ovens, such for instance, as that disclosed in the patent to Becker 1,374,546, granted April 12, 1921.

Standpipes of the character indicated are ordinarily made of cast iron and are often provided with a refractory lining to protect them from the intense heat of the gases taken off through them. These linings, however, frequently become broken, due, for instance, to the difference in their expansion and that of the pipes with variations in temperature and to the operation of "scrubbing" to remove carbon deposits. Standpipes without linings are used extensively but they burn out within a rather short time, making the continuous replacement very costly. Other means such as a water jacket integral with the standpipe have been employed to cool the same and thereby prevent injury thereto by the hot gases, but this in turn has proved unsatisfactory because when the water flow is interrupted and again resumed, as is often necessary, the cracking of the hot standpipe frequently results.

By my invention all of these disadvantages are overcome and the advantages attained that refractory linings are dispensed with, thus facilitating the "scrubbing" operation; the regions adjacent the standpipes are protected against the excessive heat of the gases, thus protecting the workmen and facilitating the operation of the ovens; the liability of the pipes to crack is materially reduced and their use may be continued even if they are cracked, thus greatly prolonging the useful life of the pipes; the excessive heat of the gases is reduced and the heat energy removed therefrom may be conserved for useful purposes.

These results I attain by surrounding the cast iron standpipe with a shell or jacket, separate and distinct therefrom, and preferably made of sheet steel. The internal diameter of the jacket is made somewhat greater than the external diameter of the ascension or standpipe and the intervening space is preferably filled with metal filings, such for instance as iron filings, or other heat conducting material which will adapt itself to the intervening space and expand or contract in response to pressure of the walls of the pipe and jacket with variations in temperature to at all times preserve a conductive path bridging said walls for the flow of heat from the pipe outwardly. In case the ascension pipe should become cracked the escape of gases will be prevented by the surrounding jacket and packing.

The jacket is provided with an inlet orifice for the introduction of a cooling medium which may conveniently be water or ammonia liquor, electively. The jacket is also provided with an outlet orifice. From the latter the liquid used to cool the gases may be taken off as such and conveyed either to a trough from which it may then be returned to the system, first passing, if desired, through a heat recovering or extracting device; or it may be conveyed to a spray device for flushing the gas offtake controlling devices, such as the pipes and valves leading into the gas main. Or, again, the cooling liquid may be retained in the jacket until it is converted into steam and then taken off to do useful work.

My invention further consists in such other new and useful improvements, and has for further objects such other operative advantages or results as may be found to obtain in the structures and devices hereinafter described or claimed.

In the accompanying drawings, forming a part of this specification and showing for purposes of exemplification a preferred form and manner in which the invention may be embodied and practiced, but without limiting the claimed invention specifically to such illustrative instance or instances:

The figure is a vertical sectional view of a standpipe provided with my improvements for effecting the cooling of the same.

In the illustrated embodiment of the invention there is shown a fragment of a coking chamber 11 provided in the top 12 with a gas outlet 13 through which discharge the gases from the distillation of the coal. The coking chamber 11 may be one of a battery of similar chambers, for example, as set forth in my prior patent hereinbefore mentioned. The discharge outlet 13 of each coking chamber 11 is equipped with a standpipe apparatus, and the standpipes of the several coking chambers are connected with and discharge into a common collecting main 14 which extends along one side of the battery.

The stand pipe apparatus includes a riser-pipe 16 constituted, preferably, of a lower vertical pipe section 17 mounted directly over the gas outlet 13 and from which the gases and distillation products pass into an upper vertical pipe section 18 set in the top of the lower section 17. At the top of the upper section 18 there is provided an inspection hole normally closed by the pivoted manually operable cover 20.

From the top of the riser pipe 16 the gases pass into the downwardly curved upper discharge pipe section 21 through the valve structure 24-25 adapted to permit a continuous flow of flushing liquid and thence into the discharge pipe section 22 into the gas main 14, there being provided a spray device 31 for continuously spraying the discharge pipe and valves as set forth more at length in the patent to van Ackeren above noted.

In accordance with my invention I provide a jacket 40 about the base of the standpipe adjacent the oven top. This jacket is preferably made of sheet metal and is provided with a feed pipe 41 adapted to supply a liquid, such as water, from a supply main 42, or ammonia liquor from a supply main 43, suitable valves 44, 45 and 46 being provided to control the flow from the respective sources. The jacket is also provided with an offtake pipe 50 adapted to convey the cooling liquid to a trough 51 or to the spray device 31, suitable valves 52, 53 and 54 being provided to control the flow in the manner desired. I also provide an offtake pipe 60 adapted to remove steam from the upper portion of the jacket and deliver it to a steam main 61, said offtake being controlled by the valve 62.

The casing or jacket 40 is made with an internal diameter greater than the external diameter of the section 17 to provide a space between the section 17 and the jacket 40 which space may be filled with a material adapted to facilitate the interchange of heat from a heat conducting bridge between the filings surrounding the section 17 on the one hand and the metal jacket 40 on the other hand to effect transfer of heat from the former to the latter. This material may conveniently comprise metal filings of a character which will not be deleteriously affected by the heat, for instance, iron filings.

In the operation of the oven the hot gases of distillation will ascend through the riser or stand pipe 16 and from thence will pass through the downcomer pipe 21, the valve 26 being open, to the main 14. These hot gases would normally tend to destroy the lower pipe section 17. However, by my invention I effect a cooling of said pipe sections sufficient to maintain it at a safe temperature by removing therefrom the excess heat by conduction through the filings 70 in contact therewith and the metal jacket 40 in heat conducting relation to said filings through which jacket I normally maintain the flow of a cooling liquid. This liquid may electively be water from the main 42 or ammonia liquid from the main 43, or the one may be used to supplement the other, suitable control being effected through the valves 44, 45 and 46. This cooling liquid after passing through the jacket may be conveyed through the offtake 50 to the trough 51 or the valve 53 being closed and the valves 52 and 54 being opened, may be conveyed to the spray device 31, or if desired it may be removed in whole or in part as steam through the offtake 60 leading to the main 61 from which the heat energy may be recovered in the form of useful work.

The invention as hereinabove set forth is embodied in a particular form of construction, but may be variously embodied within the scope of the claims hereinafter made.

I claim:

1. In standpipe apparatus for coke ovens, or the like, in combination: a standpipe; a jacket exterior to and adjacent said standpipe for receiving a cooling medium, the jacket structure being independent of that of said standpipe.

2. The combination as defined in claim 1, in which the jacket is composed of sheet steel.

3. The combination as defined in claim 1, in which a space is provided between the jacket and the standpipe, said space being filled with a heat conducting material.

4. The combination as defined in claim 1, in which a space is provided between the jacket and the standpipe, said space being filled with a heat conducting material, self-adjusting means to bridge said space.

5. The combination as defined in claim 1, in which a space is provided between the jacket and the standpipe, said space being filled with filings.

6. In standpipe apparatus for coke ovens, or the like, in combination: a standpipe apparatus, said apparatus being provided with a flushing device; a jacket exterior to and adjacent said standpipe for receiving a cooling medium; means for supplying the cooling medium to said jacket and means for conveying said medium from said jacket and delivering it as a flushing medium to said flushing pipe.

7. In standpipe apparatus for coke ovens, or the like, in combination: a standpipe; a hollow jacket exterior to and adjacent said standpipe for receiving a cooling medium, and heat conducting material between said standpipe and jacket.

8. In standpipe apparatus for coke ovens, or the like, in combination: a standpipe; a jacket exterior to and adjacent said standpipe, and heat conducting material between said standpipe and jacket.

9. The combination as defined in claim 1, in which a space is provided between the jacket and the standpipe.

In testimony whereof, I have hereunto set my hand.

JOSEPH BECKER.